United States Patent
Pfleger et al.

(10) Patent No.: US 10,480,642 B2
(45) Date of Patent: Nov. 19, 2019

(54) MULTI SPEED TRANSMISSION DEVICE WITH HYDRAULICALLY ACTUATED SHIFT RODS

(71) Applicant: ZF Friedrichshafen AG, Friedrichshafen (DE)

(72) Inventors: Tobias Pfleger, Markdorf (DE); Rainer Novak, Bregenz (AT); Florian Langenbacher, Kressbronn (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 118 days.

(21) Appl. No.: 15/667,866

(22) Filed: Aug. 3, 2017

(65) Prior Publication Data
US 2018/0051800 A1   Feb. 22, 2018

(30) Foreign Application Priority Data
Aug. 16, 2016   (DE) .................. 10 2016 215 214

(51) Int. Cl.
*F16H 61/00* (2006.01)
*F16H 61/30* (2006.01)
(Continued)

(52) U.S. Cl.
CPC .......... *F16H 61/0021* (2013.01); *F15B 11/16* (2013.01); *F15B 13/028* (2013.01);
(Continued)

(58) Field of Classification Search
CPC ... F16H 61/0206; F16H 61/0021; F16D 25/14
(Continued)

(56) References Cited

U.S. PATENT DOCUMENTS 3,583,157 A   6/1971   Adams et al.
4,618,123 A * 10/1986   Bilharz .................. F16D 25/14
                                                     137/115.16
(Continued)

FOREIGN PATENT DOCUMENTS

DE   2042094 A   4/1971
DE   19512143 C1   7/1996
(Continued)

OTHER PUBLICATIONS

Machine Translation of DE 102013222989 (translated to English by Google Translate. retrieved from http://patentscope.wipo.int on Feb. 19, 2019).*
(Continued)

*Primary Examiner* — Nathaniel E Wiehe
*Assistant Examiner* — Richard C Drake
(74) *Attorney, Agent, or Firm* — Dority & Manning, P.A.

(57) ABSTRACT

A multi-speed transmission with hydraulically actuated shift rods, wherein an actuating pressure ($p\_B$) is applicable by a valve device (15) and shuttle valves (2C to 6D) to piston chambers (2A to 6B) of pistons (2 to 6), the actuating pressure being adjustable by valves (16, 17). The piston chambers (2A to 6B) can be brought into operative connection with a low-pressure region (52) by the shuttle valves (2C to 6D) and a prefilling valve (32, 33) or by the shuttle valves (2C to 6D), the valve device (15), and the valves (16, 17). Each of the shuttle valves (2C to 6D) has a spring assembly (2E to 6F), by which the shuttle valves (2C to 6D) are held below a pressure threshold of the actuating pressure ($p\_B$) in an operating state that connects the piston chambers (2A to 6B) to the low-pressure region (52) by the prefilling valve (32, 33).

15 Claims, 9 Drawing Sheets

(51) Int. Cl.
  *F15B 11/16* (2006.01)
  *F15B 13/02* (2006.01)
  *F16H 61/02* (2006.01)
  *F16H 63/30* (2006.01)
  *F16K 31/40* (2006.01)

(52) U.S. Cl.
  CPC ....... *F16H 61/0206* (2013.01); *F16H 61/029* (2013.01); *F16H 61/0276* (2013.01); *F16H 61/30* (2013.01); *F16H 63/3023* (2013.01); *F16K 31/406* (2013.01)

(58) Field of Classification Search
  USPC .......................... 192/85.63; 475/120; 91/418
  See application file for complete search history.

(56) References Cited

U.S. PATENT DOCUMENTS

| | | | | |
|---|---|---|---|---|
| 5,249,655 | A * | 10/1993 | Person | B60K 23/02 192/12 C |
| 5,419,132 | A | 5/1995 | Sato et al. | |
| 5,441,459 | A * | 8/1995 | Inukai | F16H 61/0021 475/123 |
| 5,535,865 | A * | 7/1996 | Haka | F16D 25/14 192/109 F |
| 6,030,317 | A * | 2/2000 | Konig | F16H 61/0246 192/48.601 |
| 6,619,323 | B1 | 9/2003 | Stafford | |
| 7,338,402 | B2 * | 3/2008 | Bucher | F16H 61/0246 475/120 |
| 7,757,831 | B2 * | 7/2010 | Stehr | F16D 48/0206 192/109 F |
| 8,147,380 | B2 * | 4/2012 | Fritzer | F16H 61/2807 477/158 |
| 8,387,254 | B2 | 3/2013 | Fathauer | |
| 8,662,272 | B2 * | 3/2014 | Martin | F16D 48/0206 192/48.601 |
| 8,667,885 | B2 * | 3/2014 | Schmidt | F16H 61/0206 60/461 |
| 9,689,434 | B2 * | 6/2017 | Baraga | F16H 61/0206 |
| 9,890,850 | B2 * | 2/2018 | Novak | F16H 61/0031 |
| 2006/0006041 | A1 * | 1/2006 | Mazzonetto | B63H 23/30 192/85.63 |
| 2008/0017259 | A1 | 1/2008 | Schniederjan et al. | |
| 2008/0171633 | A1 * | 7/2008 | Gansohr | B60W 10/02 477/175 |
| 2009/0111636 | A1 * | 4/2009 | Gierer | F16H 61/0206 475/120 |
| 2010/0243402 | A1 * | 9/2010 | Momal | F16H 61/0206 192/85.63 |
| 2013/0074967 | A1 | 3/2013 | Marin et al. | |
| 2013/0327968 | A1 | 12/2013 | Suzuki et al. | |
| 2017/0045098 | A1 * | 2/2017 | Novak | F16H 61/0021 |

FOREIGN PATENT DOCUMENTS

| | | | |
|---|---|---|---|
| DE | 29617735 U1 | 11/1997 | |
| DE | 69326987 T2 | 2/2000 | |
| DE | 10327073 A1 | 1/2005 | |
| DE | 102004061861 A1 | 7/2006 | |
| DE | 102012216628 A1 | 3/2013 | |
| DE | 102013002883 A1 | 8/2014 | |
| DE | 102013222989 A1 * | 5/2015 | ............ F16H 61/30 |
| DE | 102013222989 A1 | 5/2015 | |
| DE | 102014207808 A1 | 10/2015 | |
| EP | 1023508 B1 | 5/2002 | |
| WO | WO 2009/015502 A1 | 2/2009 | |

OTHER PUBLICATIONS

German Search Report DE102016215214.9, dated May 5, 2017. (12 pages).

* cited by examiner

MULTI SPEED TRANSMISSION DEVICE WITH HYDRAULICALLY ACTUATED SHIFT RODS

FIELD OF THE INVENTION

The invention relates generally to a transmission system having a plurality of transmission ratios that can be engaged and disengaged by shift rods that are adjustable by hydraulically actuatable piston/cylinder units.

BACKGROUND

DE 10 2013 222 989 A1 discloses a transmission system having a plurality of transmission ratios that can be engaged and disengaged by shift rods that are adjustable by hydraulically actuatable piston/cylinder units. An actuating pressure can be applied by a valve device in the piston/cylinder units. The valve device includes three pilot-controlled shift valves that are coupled to each other by lines and that each have a first or a second shift position for representing the transmission ratios. The actuating pressure is freely adjustable by two pilot-controlled pressure regulating valves and can be forwarded in the direction of the valve device. Piston chambers of the piston/cylinder unit can be brought into operative connection either with the valve device or with a low-pressure region by at least one additional valve unit. In addition, the valve device is connectable to the piston chambers or the low-pressure region by the valve unit.

However, the drawback with the above design is that the additional valve unit includes a plurality of ball shuttle valves, which connect, as a function of the respective pressure that is applied, the piston chambers to either a prefilling valve or to the valve device. Therefore, during unfavorable operating condition trends, such ball shuttle valves may have undefined operating states, which in turn cause unwanted high leakage volume flows. These unwanted high leakage volume flows cause such fluctuations in the profile of a system pressure or, more specifically, the actuating pressure, that both the comfort-oriented and fast transmission ratio changes or, more specifically, the so-called sporty gear shifts, which are to be carried out within shorter operating periods than the comfort-oriented gear shifts, cannot be implemented to the extent requested in the transmission system.

SUMMARY OF THE INVENTION

Therefore, the object of the present invention is to provide a transmission system, by which both comfort-oriented gear shifts and transmission ratio changes, to be carried out within short operating periods, can be implemented to the extent requested.

Accordingly, through a transmission system having a plurality of transmission ratios, which can be engaged and disengaged by shift rods that are adjustable by hydraulically actuatable piston/cylinder units, an actuating pressure, which is freely adjustable in the region of the valves, can be applied in the piston chambers of the piston/cylinder units by a valve device and shuttle valves. The piston chambers of the piston/cylinder units can be brought into operative connection with a low-pressure region either by the shuttle valves and a prefilling valve or by the shuttle valves, the valve device, and the valves.

In order to be able to implement both, the comfort-oriented gear shifts and the transmission ratio changes to be carried out within short operating periods to the extent requested, each of the shuttle valves has a spring assembly, by which the shuttle valves are held below a pressure threshold of the actuating pressure in an operating state that connects the piston chambers to the low-pressure region by the prefilling valve.

In this way, it is ensured that during unfavorable operating condition trends and during undefined pressure conditions, the shuttle valves is transferrable into or holdable in a preferred defined operating state, starting from which the requested changes in the transmission ratio can be carried out to the extent desired and in which unwanted high leakage volume flows in the direction of the low-pressure region, starting from the valves, are avoided in a simple way.

In an advantageous further development of the transmission system, a throttle device is provided between the shuttle valves and the prefilling valve in order to be able to limit the unwanted high leakage volume flows, starting from the valves in the direction of the low-pressure region, to a defined minimum amount in the presence of a negative overlap in the region of the shuttle valves.

If with respect to the valve device, a throttle device is provided downstream of the valves and upstream of the low-pressure region, then in this region, too, a hydraulic fluid volume flow, flowing out in the direction of the low-pressure region, is adjustable in a defined manner.

If the cross section of the throttle devices between the shuttle valves and the prefilling valve is smaller than the cross section of the throttle devices downstream of the valves, then the respective hydraulic fluid volume from the piston chambers is guidable in the direction of the low-pressure region without a setting of the spring-mounted shuttle valves when carrying out a comfort-oriented gear shift, during which lower shift rod speeds are to be generated than when carrying out faster, or rather more sporty, transmission ratio changes.

In one embodiment of the inventive transmission system, the design is simple, space efficient, and operable with low open and closed loop control outlay, the throttle devices between the shuttle valves and the prefilling valve are bores, each bore is provided in a piston, arranged to be longitudinally displaceable in a valve housing between two end positions, where in this case the pistons are suppliable by the spring assemblies of the shuttle valves with a spring force acting in the direction of the first end position, in which each piston chamber is in operative connection with the prefilling valve by the shuttle valves.

In an additional embodiment of the transmission system with a simple, space efficient design that is operable with low open and closed loop control outlay, the actuating pressure can be applied at the control surfaces of the pistons so as to act against the respective spring assemblies of the shuttle valves as well as to act in the direction of the second end position of the pistons, where in the second end positions of the pistons, the piston chambers are suppliable with the actuating pressure, and the operative connection between the piston chambers and the prefilling valve is blocked to reduce or prevent unwanted leakage fluid volume flows in the direction of the low-pressure region during actuation of the shift rods.

In a further embodiment of the transmission system, the bores are provided in the diametral areas of the pistons so as to extend in the pistons perpendicular to the longitudinal axes of the pistons, where in this case the pistons are mounted via the diametral areas in the valve housings in the radial direction.

If the bores open into blind hole bores, which extend in the longitudinal direction of the pistons in the diametral areas and which are in operative connection with the prefilling valve and have diameters that are preferably larger than the diameters of the bores, then a delayed change-over of the shuttle valves due to inadmissibly high-pressure levels in the spring chambers of the shuttle valves is avoided in a simple way.

In a further embodiment of the transmission system that is simple in design, the pistons of the shuttle valves have a further diametral area, the diameters of the further diametral areas are larger than the diameters of the diametral areas and circumscribe at least in certain regions the diametral areas in the longitudinal direction.

If an annular groove is provided in certain regions between the further diametral areas and the diametral areas of the pistons, into which annual grooves the diametral areas of the respective encircling spring assemblies are arranged in certain regions, with one end of each of the spring assemblies abutting in the groove bottoms of the annular grooves and the other end abutting the valve housing, then the spring assembly is protected against buckling in a way that is simple in design.

In another embodiment of the transmission system, the pistons are designed at least partially as a two-part piston.

If the pistons are designed at least partially as one part, then the transmission system of the invention is characterized by its low assembly outlay.

If the spring assemblies encircle both the diametral areas and additional diametral areas, with the diameters of the additional diametral areas being smaller than the diameters of the further diametral areas and larger than the diameters of the diametral areas, and with the one end of the spring assemblies abutting on the diameter step between the further diametral areas and the additional diametral areas, and the other end abutting on the valve housings, then the transmission system of the invention is producible with minimal manufacturing outlay.

If the throttle devices between the shuttle valves and the prefilling valve each comprise at least two mutually aligned bores, which connect the blind hole bores to the peripheral areas defined by the diametral areas of the pistons and the valve housings, then the transverse forces acting on the pistons are reduced or prevented in a simple way.

In one embodiment of the transmission system characterized by a long service life, the pistons are anodized at least partially at least in certain regions.

Not only the features disclosed in the patent claims, but also the features disclosed in the following exemplary embodiments of the transmission system of the invention are suitable, individually or in any desired combination with one another, for refining the subject matter of the present invention.

Further advantages and advantageous embodiments of the transmission system according to the invention will become apparent from the patent claims and the exemplary embodiments described in principle below with reference to the drawings, where for the sake of clarity, the same reference numerals and characters are used for those components that are structurally and functionally the same, in the description of the various exemplary embodiments.

BRIEF DESCRIPTION OF THE DRAWINGS

The invention is described more specifically by example on the basis of the attached figures. The following is shown.

DETAILED DESCRIPTION

Reference will now be made to embodiments of the invention, one or more examples of which are shown in the drawings. Each embodiment is provided by way of explanation of the invention, and not as a limitation of the invention. For example, features illustrated or described as part of one embodiment can be combined with another embodiment to yield still another embodiment. It is intended that the present invention include these and other modifications and variations to the embodiments described herein.

Figure 1:
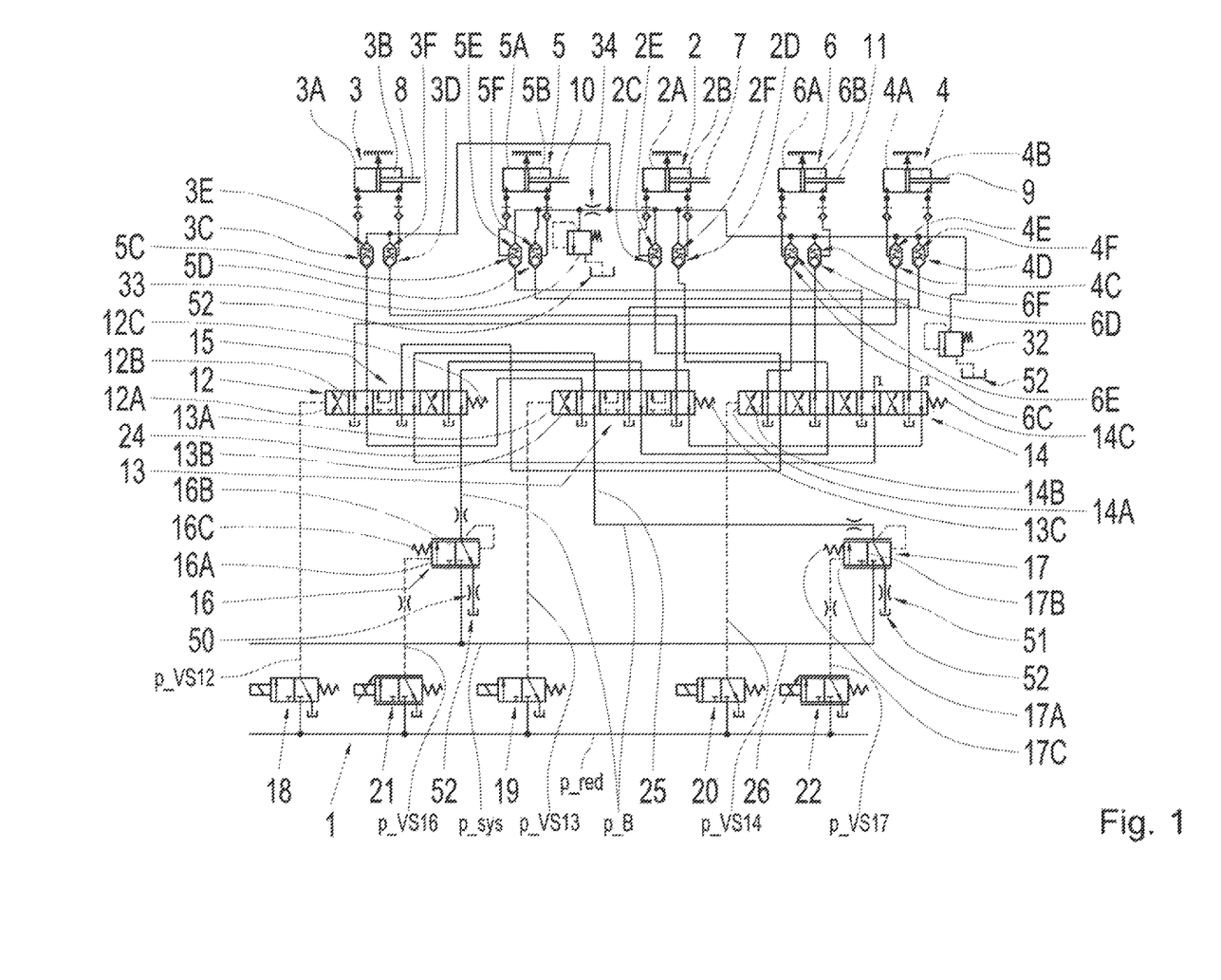
FIG. 1 is a partial view of a hydraulic diagram of a first embodiment of the transmission system according to the invention.

FIG. 1 shows a part of a hydraulic diagram of a transmission system 1, in which nine transmission ratios for forward drive and one transmission ratio for reverse drive are engagable. The transmission ratios are engageable and disengageable by shift rods 7 to 11, which are adjustable by five hydraulically actuatable piston/cylinder units 2 to 6. An actuating pressure p_B can be applied by a valve device 15, which in the present case includes three pilot-controlled shift valves 12, 13 and 14 coupled to each other by lines, by the piston/cylinder units 2 to 6 or, more specifically, in the piston chambers 2A, 2B or 3A, 3B or 4A, 4B or 5A, 5B or 6A, 6B. Each of the shift valves 12 to 14 has a first or second shift position for representing the transmission ratios. The actuating pressure p_B is freely adjustable by two valves 16, 17, which are pilot-controlled pressure regulating valves, and can be forwarded in the direction of the valve device 15.

In the present case, each of the shift valves 12 to 14 is suppliable by the pilot control valves 18, 19, 20, which are solenoid valves, with pilot control pressure p_VS12, p_VS13 or p_VS14 at a control surface 12A, 13A or 14A of a valve slide 12B, 13B or 14B in the direction of a second shift position. Moreover, a spring force, acting in the direction of the first shift position, of a spring assembly 12C, 13C, 14C acts on the shift valves 12 to 14, respectively. A pressure signal p_red is available at not only the pilot control valves 18 to 20, but also at the electrically actuatable pressure actuators 21, 22, by which a respective pilot control pressure p_VS16 for the first pressure regulating valve 16 or a pilot control pressure p_VS17 of the second pressure regulating valve 17 is continuously adjustable between 0 and the maximum value, and applicable to a control surface 16A or 17A of a valve slide 16B or 17B of the pressure regulating valve 16 or the pressure regulating valve 17, as functionally equivalent to a spring force of a spring assembly 16C or 17C, which also acts at the valve slide 16B or 17B. In this case, the maximum value of the pilot control pressure value p_VS16 or p_VS17 corresponds to the pressure value of the pressure signal p_red acting in each case.

The pilot control pressure levels p_VS12, p_VS13 and p_VS14 of the shift valve 12 to 14, respectively, are, as a function of the currently existing shift position of the pilot control valves 18 to 20, either equal to 0 or correspond to the pressure value of the pressure signal p_red. The pressure regulating valves 16 and 17 are supplied with a system pressure p_sys, or rather a working pressure, which is fed to the valve device 12 or to the valve device 13 as an actuating pressure p_B, altered in a manner dependent of the pilot control pressure p_VS16 or p_VS17 available in the pressure regulating valve 16 or 17. In so doing, the actuating pressure p_B, set by the pressure regulating valve 17, is forwarded in the direction of the piston chambers 2A, 3A, 4A, 5A and 6A by the shift valves 12, 13 and 14, while the actuating pressure p_B, set by the pressure regulating valve 16, is fed by the valve devices 12 to 14 in the direction of the piston chambers 2B, 3B, 4B, 5B and 6B, through which each of the shift rods 7 to 11 extends.

If the pilot control pressure p_VS16 or p_VS17 is essentially equal to zero and if the actuating pressure p_B simultaneously has a pressure level greater than a pressure threshold, then the pressure regulating valves 16 and 17 are in the operating state (shown in FIG. 1), in which a line 24, extending between the pressure regulating valve 16 and the valve device 12, and a further line 25, extending between the valve device 13 and the pressure regulating valve 17, are in operative connection by a throttle device 50 or 51 with a low-pressure region 52 equivalent to the oil sump of the transmission system 1. As the pilot control pressure p_VS16 or p_VS17 increases, the lines 24 and 25 are connected by the pressure regulating valves 16 and 17 to the line 26, conveying the system pressure p_sys. Then, as a function of the set shift positions of the valve devices 12 to 14, said pressure can be forwarded, as the actuating pressure p_B, in the direction of the piston chambers 2A to 6B by the valve devices 12 to 14.

In the present case, the piston chambers 2A to 6B, representing the pressure chambers, of the piston/cylinder units 2 to 6 can be brought into operative connection with one of the shift valves 12, 13 or 14 of the valve device 15 or with the low-pressure region 52 by a plurality of ball shuttle valves 2C, 2D, 3C, 3D, 4C, 4D, 5C, 5D, 6C and 6D. In this case, the low-pressure region 52 is provided, on the one hand, downstream of a pressure limiting valve 32 and, on the other hand, downstream of a further pressure limiting valve 33. Between the pressure limiting valves 32 and 33 there is a throttle device 34, by which it is possible to adjust a prefilling pressure level for the piston/cylinder units 2 to 4 and 6 that is different from the one for the piston/cylinder unit 5, which upstream of the throttle device 34 is in operative connection with the further pressure limiting valve 33 by the shuttle valves 5C and 5D in the normal position as shown in FIG. 1 of the shuttle valves 5C and 5D.

Figure 2:
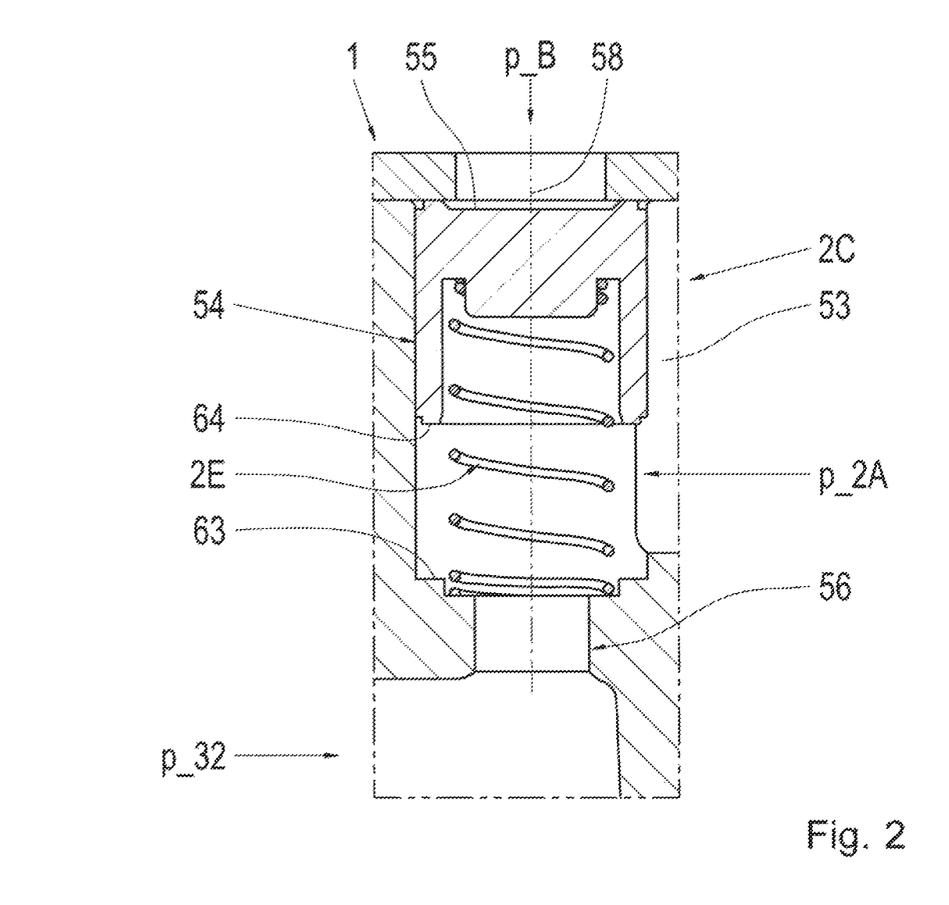
FIG. 2 is a detailed view of a shuttle valve of the transmission system in accordance with FIG. 1.

FIG. 2 is an enlarged view of the shuttle valve 2C standing by itself and exhibiting the same construction as the other shuttle valves 3C to 6C and 2D to 6D, for which reason the way in which the shuttle valves 2C to 6D work is described in more detail below only with respect to the shuttle valve 2C.

The shuttle valve 2C includes a piston 54, which is longitudinally displaceable in a valve housing 53 and held by a spring assembly 2E in the first end position, shown in FIG. 2. At its end face 55 or, more specifically, its control surface, the piston 54 is charged with the actuating pressure p_B, set by the pressure regulating valve 17, when the transmission system 1 is in operation, while the pressure p_2A acting in the piston chamber 2A is available in the spring chamber of the spring assembly 2E of the shuttle valve 2C. Then said pressure p_2A corresponds to the prefilling pressure level of the prefilling pressure p_32, set by the pressure limiting valve 32, where the spring chamber is in operative connection with the prefilling valve 32 over a diametral area 56 of the valve housing 53.

That means that in an operating state of the valve device 15, in which the piston chamber 2A is not to be supplied with a pressure level of the actuating pressure p_B that overcompresses the spring assembly 2E, the piston chamber 2A is vented by the shuttle valve 2C in the direction of the low-pressure region 52 via the pressure limiting valve 32.

In addition, there is the option of supplying the shuttle valve 2C at the control surface or, more specifically, the end face 55 of the piston 54 with such an actuating pressure p_B that the piston 54 is lifted by the actuating pressure p_B off of the valve housing 53 against the spring force of the spring assembly 2E and is shifted into its second end position, in which the piston chamber 2A is no longer in operative connection with the pressure limiting valve 32. If, in addition, the piston chamber 2B is supplied with an actuating pressure p_B, set by the pressure regulating valve 16, by the shuttle valve 2D, so that the shift rod 4 is adjusted with respect to the pressure level that is available in the piston chamber 2A, and the volume of the piston chamber 2A is reduced, then the hydraulic fluid volume present in the piston chamber 2A is forced out of said piston chamber in the direction of the valve device 15 by the shuttle valve 2C and, when the existing operating state of the valve device 15 is suitable, is fed in the direction of the pressure regulating valve 17, which is then also in the operating state, shown in FIG. 1, in order to be able to push the hydraulic fluid volume discharged from the piston chamber 2A in the direction of the low-pressure region 52 by the pressure regulating valve 17 and the throttle device 51.

In order to achieve a defined slow rate of adjustment of the shift rods during comfort-oriented gear shifts and a rate of adjustment that is as high as possible for sporty gear shifts, the venting paths, which are engageable by the shuttle valves 2C to 6D, for the piston chambers 2A to 6B in the direction of the pressure limiting valves 32 and 33 or in the direction of the pressure regulating valves 16 and 17 or the throttle devices 50 and 51 are designed such that owing to the larger diameters, the pressure paths in the direction of the pressure limiting valves 32 and 33 are characterized by a smaller pressure loss than the venting paths of the piston chambers 2A to 6B by the shuttle valves 2C to 6D, the valve device 15 and the pressure regulating valves 16 and 17 or the downstream throttle devices 50 and 51. This arrangement is implemented by the cross sections of the throttle devices 50 and 51 being smaller than the cross sections of the pressure limiting valves 32 and 33.

Figure 3:
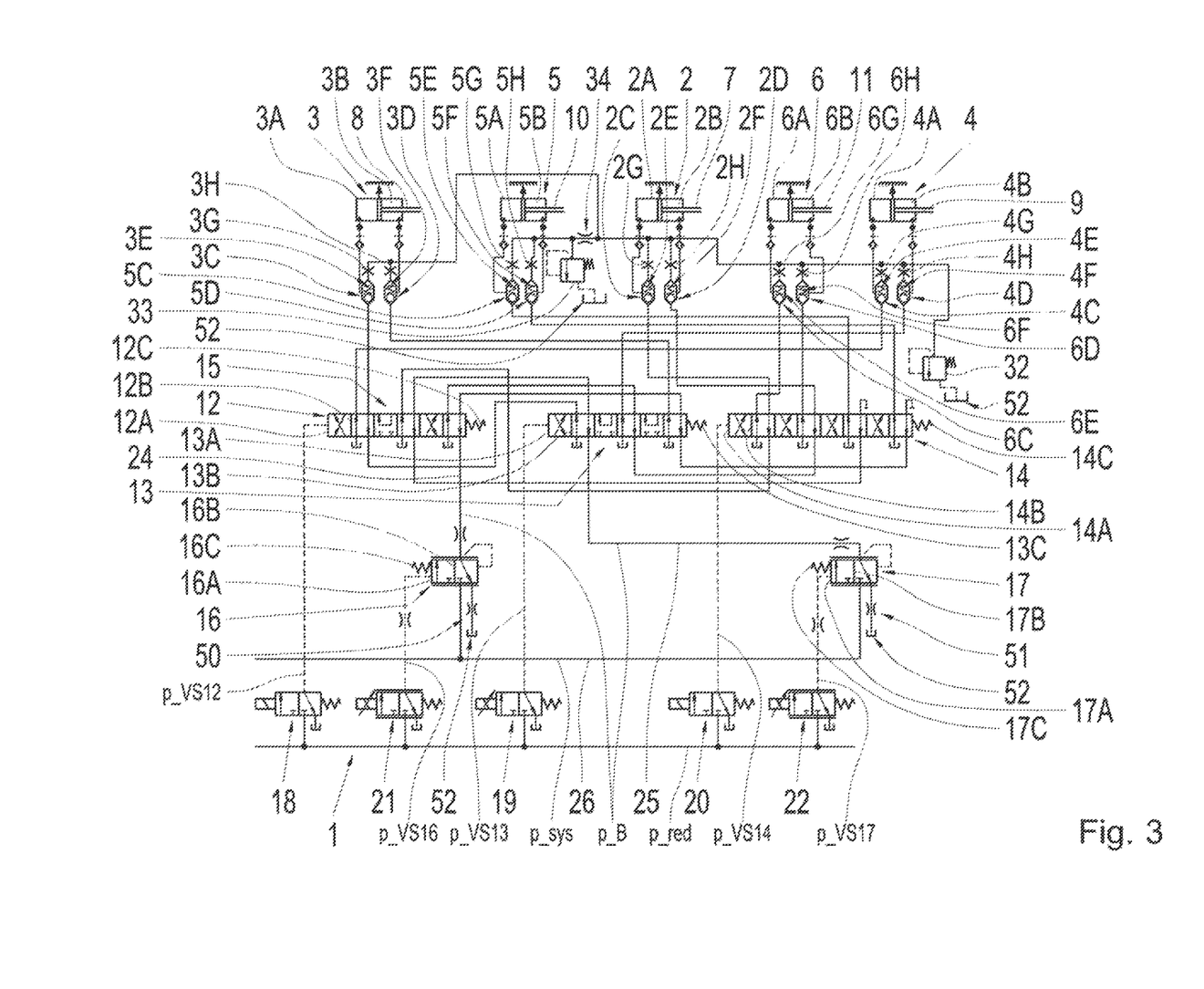
FIG. 3 is a view corresponding to that of FIG. 1 of a hydraulic system of a second embodiment of the transmission system according to the invention.

FIG. 3 shows a view, corresponding to that in FIG. 1, of a hydraulic system of a second embodiment of the transmission system 1, which for the most part corresponds to the hydraulic system of the transmission system 1 in accordance with FIG. 1, for which reason only the differences between the two embodiments will be discussed in detail in the following description; with respect to the way in which the rest of the transmission system 1 in accordance with FIG. 3 works, reference is made to the above description in conjunction with FIG. 1.

In the transmission system 1 in accordance with FIG. 3, throttle devices 2G to 6H having a smaller cross section than the cross section of the throttle devices 50 and 51, are provided in the region between the shuttle valves 2C to 6D and the pressure limiting valves 32 and 33. As in the case of the transmission system 1 in accordance with FIG. 1, in the transmission system 1 in accordance with FIG. 3, the shift rods 7 to 11 of the transmission system 1 are hydraulically actuated by the piston/cylinder units 2 to 6. The side of the piston/cylinder units 2 to 6 to be engaged or, more specifically, pressurized is actuated by the pressure regulating valves 16 and 17, in order to set the actuating pressure p_B and the shift valves 12 and 14, in order to select the respective shift rod 7 to 11, which is to be adjusted, as well as the spring-mounted shuttle valves 2C to 6D.

In the transmission system 1 in accordance with FIG. 1, the respective transmission ratio to be disengaged in each case and the associated side to be evacuated or, more specifically, the associated piston chamber 2A to 6B, to be evacuated, of the piston/cylinder units 2 to 6 are vented over the fast hydraulic venting path by the shuttle valves 2C to 6D in the starting position, shown in FIG. 1, and by one of the pressure regulating valves 32 or 33 into the oil sump or rather in the direction of the low-pressure region 52, thus over a hydraulic path having the smallest possible pressure losses.

In contrast, while carrying out a comfort-oriented gear shift, the respective piston chamber 2A to 6B to be disengaged or, more specifically, evacuated, in the transmission system 1 in accordance with FIG. 1, the venting is carried out over the slow hydraulic path by shifting the associated shuttle valve 2C to 6D against the spring assembly 2E to 6F by a setting pressure, set by the associated pressure regulating valve 16 or 17; and the piston chamber 2A to 6B to be vented of a piston/cylinder unit 2 to 6 is connected to the low-pressure region 52 by the set shuttle valve 2C to 6D respectively, the shift valves 12 to 14 and one of the pressure regulating valves 16 or 17 as well as the associated throttle device 50 or 51.

During unfavorable operating condition trends, such as, for example, a startup operation of a vehicle with the transmission system 1 in accordance with FIG. 1, during which a driving machine is operated at its idle speed level, or during a coasting shift, the hydraulic system of the transmission system 1 in accordance with FIG. 1 is provided with only a small hydraulic fluid volume flow. If during such an operating state of the transmission system 1 in accordance with FIG. 1, a comfort-oriented gear shift is requested, during which one of the shuttle valves 2C to 6D is transferred into its shifted operating state to the extent prescribed by applying a setting pressure against its spring system 2E to 6F for venting the associated piston chamber 2A to 6B, then owing to a negative overlap an unwanted circumflow of the shuttle valves 2C to 6D occurs by the shuttle valves 2A to 6B. During the setting operation of the shuttle valves 2C to 6D, said circumflow causes an additional leakage that cannot be ignored. During the aforementioned unfavorable operating condition trends of the transmission system 1 described above for illustrative purposes, this additional leakage leads to an excess demand on the oil balance of the system, and under some circumstances this excess demand is accompanied by a drop in the pressure of the system pressure.

Since in order to vent the piston chambers 2A to 6B over the slow venting path of the hydraulic system of the transmission system 1 in accordance with FIG. 1, both shuttle valves 2C and 2D or 3C and 3D or 4C and 4D or 5C and 5D or 6C and 6D of the respective piston/cylinder unit 2, 3, 4, 5, or 6, which is to be currently actuated, have to be set during unfavorable operating condition trends of the transmission system 1 in accordance with FIG. 1, the undersupply operating states of the hydraulic system of the transmission system 1 in accordance with FIG. 1 occur with a higher probability during venting over the slower hydraulic path than is the case when venting a piston/cylinder unit 2 to 6 over the faster venting path of the hydraulic system of the transmission system 1 in accordance with FIG. 1. This is also the case because while venting over the faster hydraulic venting path and, thus, during a sportier gear shift, sufficient oil for supplying the hydraulic system is usually available and, in addition, only the shuttle valve 2C to 6D, which is associated with the side which has to be engaged in each case, or, more specifically, which is associated with the piston chamber 2A to 6B, which is to be supplied with actuating pressure, has to be set.

In order to avoid the undersupply operating states during actuation of the piston/cylinder units 2 to 6 in a structurally simple and cost effective manner, the hydraulic system of the transmission system 1 in accordance with FIG. 3 in the region between the shuttle valves 2C to 6D and the pressure limiting valves 32 and 33 has throttle devices 2G to 6H with cross sections that are smaller in size than the cross sections of the throttle devices 50 and 51 downstream of the pressure regulating valves 16 and 17.

During comfort-oriented gear shifts these measures or, more specifically, this adaptation of the venting cross sections allow the piston chambers 2A to 6B in the transmission system 1 in accordance with FIG. 3 to be vented over the short venting path, which runs in the direction of the low-pressure region 52 by shuttle valves 2C to 6D, the throttle devices 2G to 6F and the pressure limiting valves 32 and 33. In contrast, during sporty gear shifts, during which the gear shift operation is to be carried out within substantially shorter shifting periods, or rather operating periods, than during comfort-oriented gear shifts, the piston chambers 2A to 6B are vented by the shuttle valves 2C to 6D, the shift valves 12 to 14 and the pressure regulating valves 16 and 17 as well as the throttle devices 50 and 51 in the direction of the low-pressure region 52 and, thus, over the long venting path.

That means that owing to the adaptation of the venting cross sections by the throttle devices 50 and 51 and the throttle devices 2G to 6F, the slow and the fast venting paths are exchanged in the transmission system 1 in accordance with FIG. 3, as compared to the transmission system 1 in accordance with FIG. 1; and for venting the side of the piston/cylinder unit 2 to 6 that is to be disengaged over the slow hydraulic venting path, the associated shuttle valve 2C to 6D does not have to be adjusted to the prescribed extent by a setting pressure, adjusted by one of the pressure regulating valves 16 to 17, or, more specifically, has to be shifted against an abutting spring assembly 2E to 6F, respectively.

In this way the venting of the piston chamber 2A to 6B, which is associated with the transmission ratio to be disengaged in each case, of the piston/cylinder units 2 to 6 is carried out over the slow venting path of the hydraulic system of the transmission system 1 in accordance with FIG. 3 by the spring-mounted shuttle valves 2C to 6D, which are already present in the starting position, and by one of the pressure limiting valves 32, 33 in the direction of the low-pressure region 52 or, more specifically, the oil sump of the transmission system 1.

FIG. 4 to FIG. 9 show views corresponding to FIG. 2 of various embodiments of the shuttle valve 2C of the transmission system 1 in accordance with FIG. 3, that differ from each other only in subareas of the shuttle valve 2C in accordance with FIG. 2 and, in addition, also among each other only in subareas. For this reason, in the following description in conjunction with FIG. 4 to FIG. 9 only the differences with respect to the design of the shuttle valve 2C in accordance with FIG. 2 or the major differences between the individual embodiments of the shuttle valve 2C in accordance with FIG. 4 to FIG. 9 will be discussed in detail; and with respect to the way in which the rest of the shuttle valve 2C works, reference is made to the description above.

The shuttle valves 3C to 6C and 2D to 6D of the transmission system 1 in accordance with FIG. 3 can be implemented, in turn, to the same extent as the shuttle valve 2C in accordance with FIG. 4 to FIG. 9, for which reason reference is made only to the shuttle valve 2C in the following description in conjunction with FIG. 4 to FIG. 9.

Figure 4:
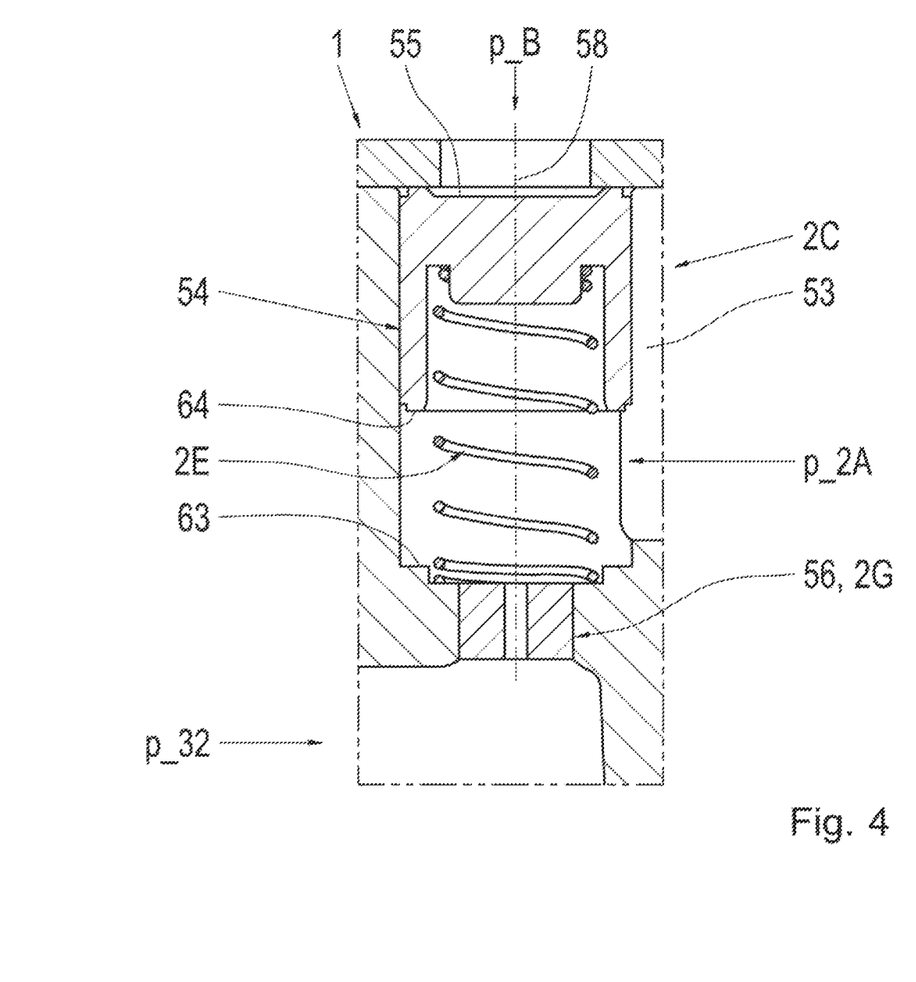
FIG. 4 is a view corresponding to that in FIG. 2 of a first embodiment of a shuttle valve of the transmission system in accordance with FIG. 3.

The embodiment of the shuttle valve 2C in accordance with FIG. 4 differs from the embodiment of the shuttle valve 2C in accordance with FIG. 2, in that the diametral area 56 of the shuttle valve 2C in accordance with FIG. 2, where said area is defined by the valve housing 53, has a much larger diameter than the diametral area 56 of the shuttle valve 2C in accordance with FIG. 4, where in this case the diametral area 56 of the shuttle valve 2C is equal to the cross section of the throttle device 2G.

Figure 5:
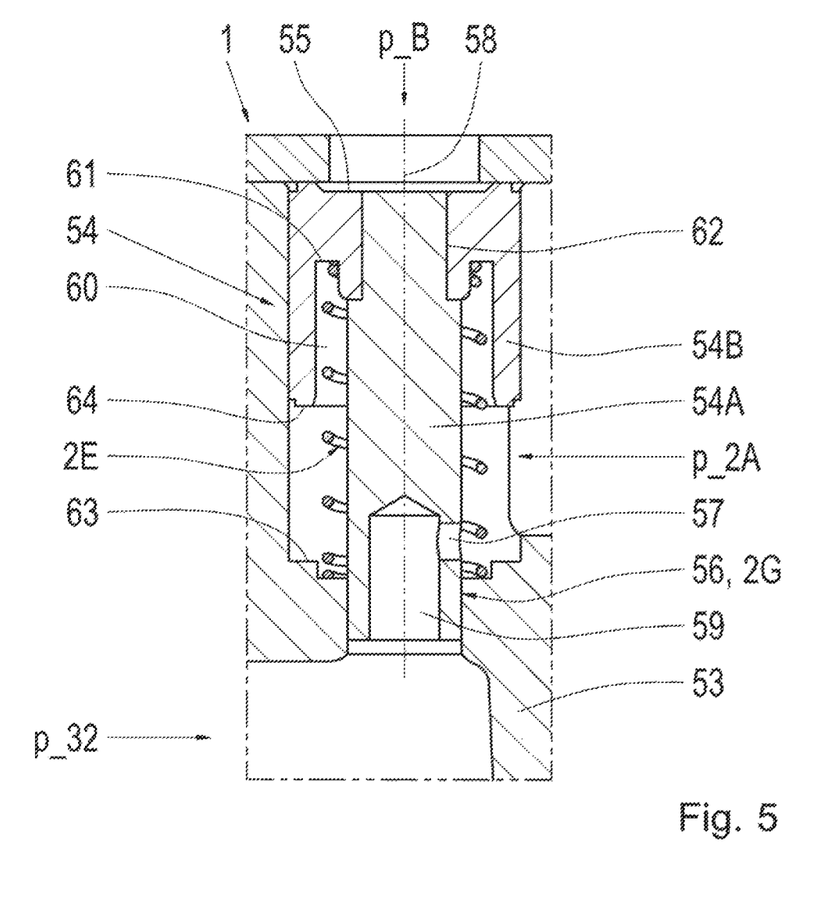
FIG. 5 is a view corresponding to that in FIG. 4 of a second embodiment of a shuttle valve of the transmission system in accordance with FIG. 3.

In a further embodiment of the shuttle valve 2C shown in FIG. 5, the throttle device 2G between the shuttle valve 2C and the prefilling valves 32 and 33 is a bore 57 provided in a diametral area 54A of the piston 54 and extending perpendicularly to the longitudinal axis 58 of the piston 54, where in this case the piston 54 is mounted in the radial direction via the diametral area 54A in the valve housing 53. In this case the bore 57 opens into a blind hole bore 59 extending in the longitudinal direction of the piston 54 in the diametral area 54A and in operative connection with the pressure limiting valves 32, 33. In addition, the piston 54 of the shuttle valve 2C in accordance with FIG. 5 includes a further diametral area 54B with a diameter that is larger than the diameter of the diametral area 54A and which includes the diametral area 54A in the longitudinal direction of the piston 54. In this case an annular groove 60, in which the spring assembly 2E surrounding the diametral area 54A is arranged, is formed between the further diametral area 54B and the diametral area 54A of the piston 54. In this case one end of the spring assembly 2E abuts in the groove bottom 61 of the annular groove 60 and the other end abuts the valve housing 53.

The piston 54 of the shuttle valve 2C in accordance with FIG. 5 is a two-part piston, where the diametral area 54A extends into a sleeve-like region 62 of the further diametral area 54B and is permanently connected to the further diametral area 54B by, for example, a press fit, bonded joint, or any other type of connection that is appropriate. Furthermore, in the first end position of the piston 54, the diametral area 54A already extends as far as into the diametral area 56 of the valve housing 53, so that the piston 54 is longitudinally displaceable over the further diametral area 54B and the diametral area 54A in the radial direction in the valve housing 53 and relative thereto. In the second end position of the piston 54, the further diametral area 54B abuts sealingly with its end 64, facing away from the control surface 55, the stop area 63 of the valve housing 53, so that in the second end position of the piston 54 the operative connection between the piston chamber 2A and the pressure limiting valves 32 and 33 is blocked by the valve housing 53 and the piston 54.

Figure 6:
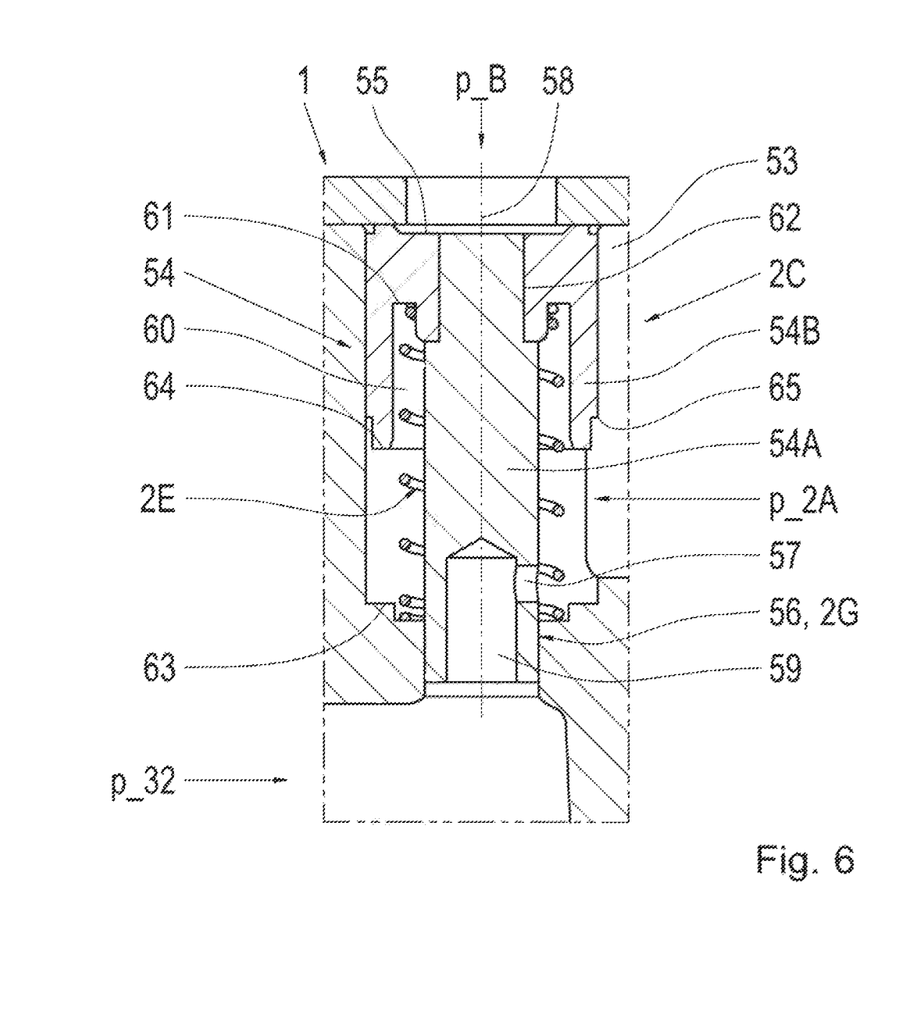
FIG. 6 shows a further development of the second embodiment of the shuttle valve, shown in FIG. 5.

The embodiment of the shuttle valve 2C, shown in FIG. 6, corresponds almost totally to the embodiment of the shuttle valve 2C, shown in FIG. 5, except for a reduction, which is provided close to the end 64 in the peripheral area of the further diametral area 54B of the piston 54 and by which the further diametral area 54B has an edge 65, in order to enable a pressure drop off at low operating temperatures.

Figure 7:
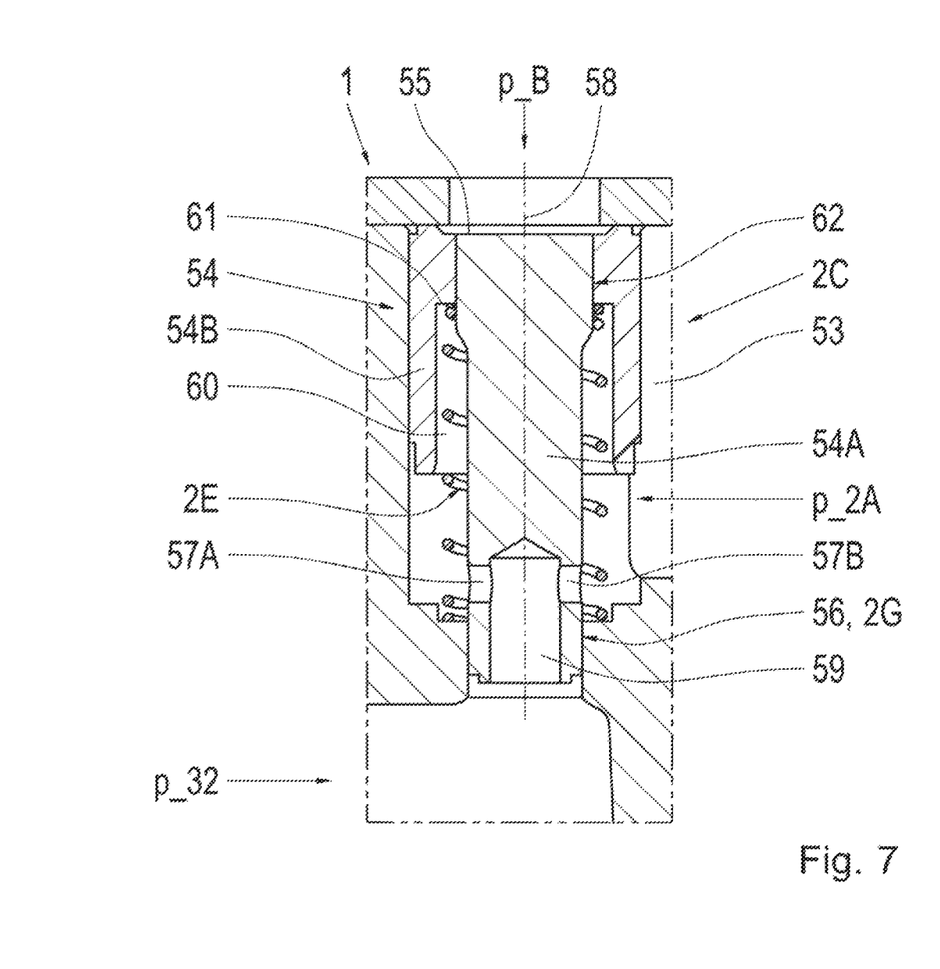
FIG. 7 shows another embodiment of a shuttle valve of the transmission system in accordance with FIG. 3 in a view corresponding to that in FIG. 4.

The embodiment of the shuttle valve 2C, shown in FIG. 7, is in turn a further development of the embodiment of the shuttle valve 2C, shown in FIG. 6, in which the throttle device 2G, disposed between the shuttle valve 2C and the pressure limiting valves 32 and 33, includes two mutually aligned bores 57A and 57B which connect the blind hole bore 59 to the area defined by the diametral area 54A of the piston 54 and the valve housing 53. In this embodiment of the shuttle valve 2C, the transverse forces, which adversely affect the longitudinal movement of the piston 54 in the valve housing 53 and which act on the piston 54, are low with minimum effort. In addition, the diametral area 54A has, in contrast to the embodiment of the shuttle valve 2C in accordance with FIG. 6, an expansion in the connecting area with the further diametral area 54, whereas the diametral area 54A of the shuttle valve 2C in accordance with FIG. 6 has a reduced diameter in the connecting area with the further diametral area 54B. In addition, at its end facing away from the further diametral area 54B, the diametral area 54A of the piston 54 has a step for an edge protection in its outer peripheral area.

Figure 8:
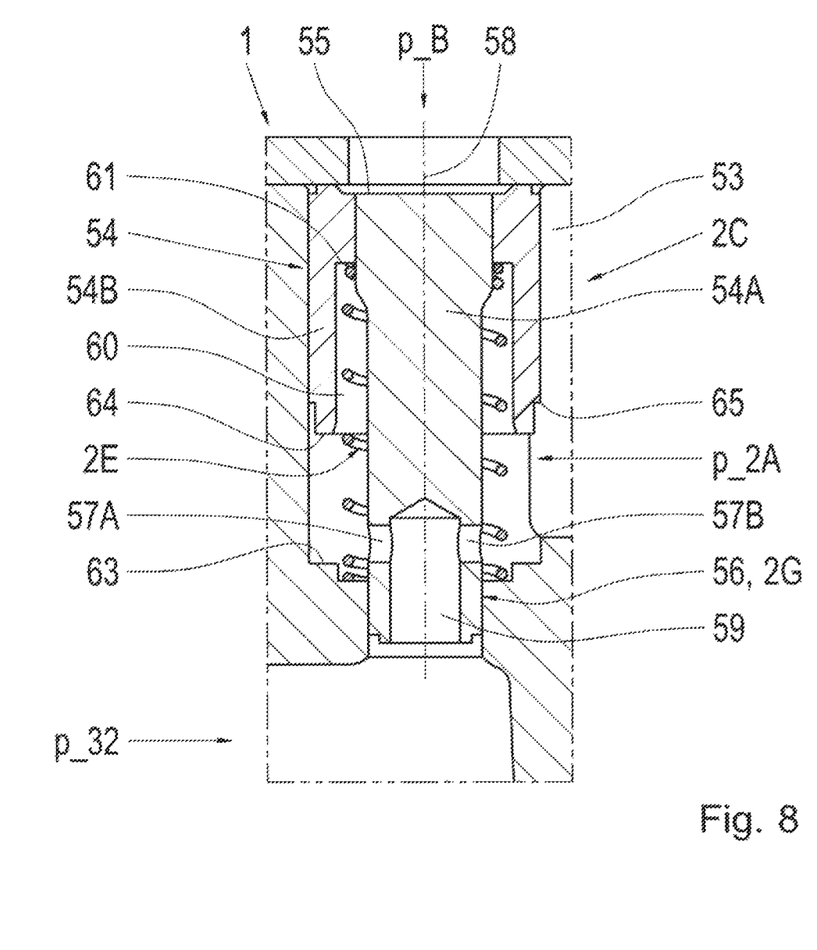
FIG. 8 shows an additional embodiment of a shuttle valve of the transmission system in accordance with FIG. 3 in a view corresponding to that in FIG. 4.

The embodiment of the shuttle valve 2C, shown in FIG. 8, is basically identical in construction to the shuttle valve 2C in accordance with FIG. 7, where in this case the piston 54 of the shuttle valve 2C in accordance with FIG. 8 is made in one piece and is also anodized, in order to simplify the assembly and to enhance the corrosion resistance and also the wear resistance of the piston 54.

Figure 9:
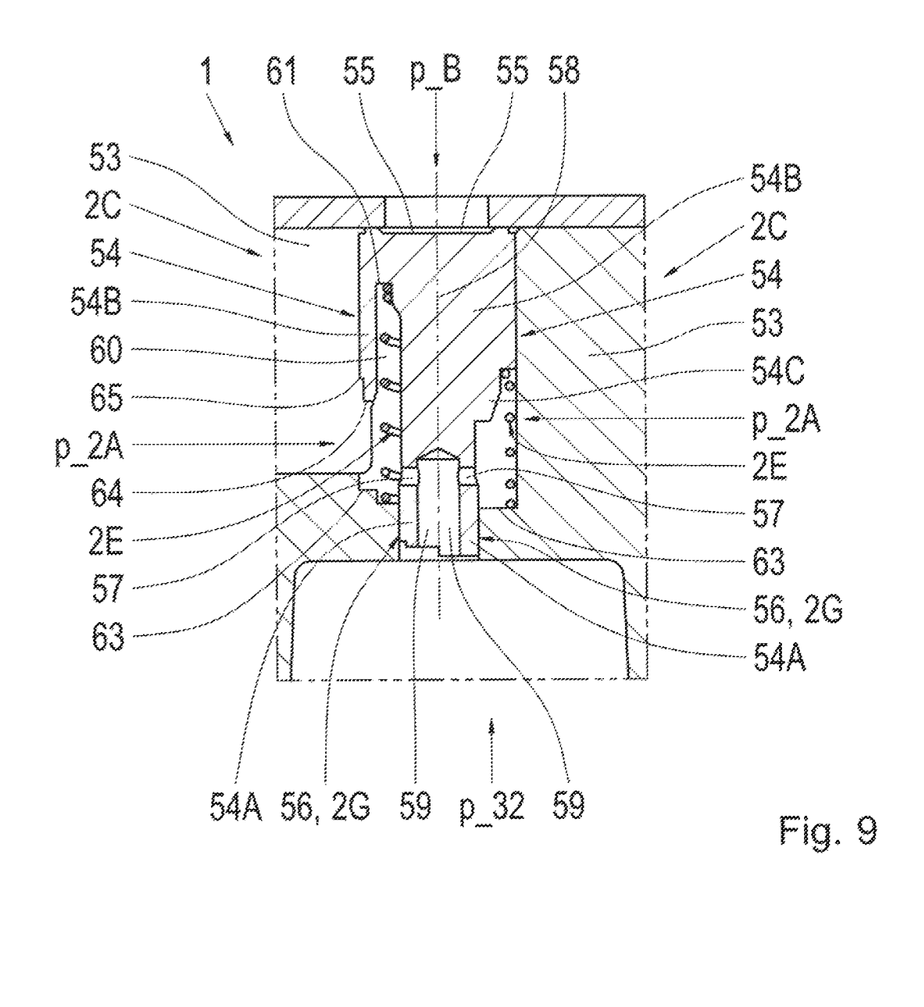
FIG. 9 shows a comparison of the embodiment of the shuttle valve, shown in FIG. 8, and an additional possible embodiment of the shuttle valve of the transmission system in accordance with FIG. 3.

FIG. 9 shows the embodiment of the piston 54 of the shuttle valve 2C, shown in FIG. 8, and an additional embodiment of the shuttle valve 2C, in which the piston 54 adjacent to the diametral area 54A and the further diametral area 54B has an additional diametral area 54C, each as a half section. In the embodiment of the shuttle valve 2C having the additional diametral area 54C, the piston 54 is produced without the annular groove 60; and the spring assembly 2E encircles both the diametral area 54A and the additional diametral area 54C. The diameter of the additional diametral area 54C is smaller than the diameter of the further diametral area 54B and larger than the diameter of the diametral area 54A. In this case, one end of the spring assembly 2E abuts the step in diameter between the further diametral area 54B and the additional diametral area 54C, and the other end abuts the valve housing 53.

In general, the diametral area 54A of the piston 54 is a pin in all of the embodiments of the shuttle valve 2C shown in FIG. 4 to FIG. 9; the pin has the blind hole bore 59, or rather an oblong bore, and at least one transverse bore 57 or 57A, 57B which opens into the former. In this case the diameter of the bore 57 or 57A, 57B is smaller than the diameter of the blind hole bore 59. One end of the pin 54A of the piston 54 protrudes into the large venting cross section of the diametral area 56, so that it is reduced. Owing to this measure there is much less additional leakage when setting the shuttle valves 2C to 6D than in the embodiment of the shuttle valves 2C to 6D in accordance with FIG. 2.

In addition, when venting the piston chambers 2A to 6B over the slow venting path in the case of the transmission system 1 in accordance with FIG. 3, it is only necessary to set the shuttle valve 2C to 6D, which is associated with the side of the piston/cylinder unit 2 to 6 to be engaged in each case. Moreover, there is no longer any leakage by the pressure actuator 21 or the pressure actuator 22 when setting, as required in the operation of the transmission system 1, the shuttle valve 2C to 6D associated with the side of the respective piston/cylinder unit 2 to 6 to be disengaged. As a result, the leakage balance is significantly improved while venting over the slow venting path; and the robustness of the hydraulic system against systemic pressure drops is significantly increased.

In addition, in the embodiment of the transmission system 1 in accordance with FIG. 3, the venting of the side to be disengaged over the fast venting path is carried out in the direction of the low-pressure region 52 or, more specifically, the oil sump by the respective shuttle valves 2C to 6D, which are to be set for this purpose, the shift valves 12 to 14, one of the pressure regulating valves 16 or 17, and a cross section, which is significantly enlarged, compared to the embodiment of the transmission system 1 in accordance with FIG. 1, by the throttle devices 50 or 51. Owing to the reduced venting cross section downstream of the shuttle valves or, more specifically, by the throttle devices 2G to 6H, the leakage balance is better even during the setting of both shuttle valves of the fast venting path than in the embodiment of the transmission system 1 in accordance with FIG. 1.

Modifications and variations can be made to the embodiments illustrated or described herein without departing from the scope and spirit of the invention as set forth in the appended claims.

LIST OF REFERENCE NUMERALS AND CHARACTERS

1 transmission system
2 piston/cylinder unit
2A, B piston chamber
2C, D shuttle valve
2E, F spring assembly
2G, H throttle device
3 piston/cylinder unit
3A, B piston chamber
3C, D shuttle valve
3E, F spring assembly
3G, H throttle device
4 piston/cylinder unit
4A, B piston chamber
4C, D shuttle valve
4E, F spring assembly
4G, H throttle device
5 piston/cylinder unit
5A, B piston chamber
5C, D shuttle valve
5E, F spring assembly
5G, H throttle device
6 piston/cylinder unit
6A, B piston chamber
6C, D shuttle valve
6E, F spring assembly
6G, H throttle device
7 to 11 shift rod
12 shift valve
12A control surface
12B valve slide
12C spring assembly
13 shift valve
13A control surface
13B valve slide
13C spring assembly
14 shift valve
14A control surface
14B valve slide
14C spring assembly
15 valve device
16 valve, pressure regulating valve
16A control surface
16B valve slide
16C spring assembly
17 valve, pressure regulating valve
17A control surface
17B valve slide
17C spring assembly
18 to 20 pilot control valve
21, 22 pressure actuator
24 to 26 line
32, 33 pressure limiting valve
34 throttle device
50 throttle device
51 throttle device
52 low-pressure region
53 valve housing
54 piston
54A diametral area
54B further diametral area
54C additional diametral area
55 control surface
56 diametral area
57 bore
57A, B bore
58 longitudinal axis
59 blind hole bore
60 annular groove
61 groove bottom
62 sleeve-like region
63 stop area
64 end of the further diametral area
65 edge
$p\_B$ actuating pressure
$p\_red$ pressure signal
$p\_sys$ system pressure
$p\_VS$ pilot control pressure
$p\_2A$ pressure in the piston chamber
$p\_32$ prefilling pressure

The invention claimed is:
1. A multi-speed transmission, comprising:
 a plurality of hydraulically actuated shift rods (7 to 11);
 a plurality of piston units (2 to 6) with a plurality of piston chambers (2A to 6B), the plurality of piston units (2 to 6) configured for adjusting the plurality of hydraulically actuated shift rods (7 to 11) to change a transmission ratio of the multi-speed transmission;
 a valve device (15);
 a plurality of shuttle valves (2C to 6D), each of the shuttle valves (2C to 6D) having a spring assembly (2E to 6F); and
 a plurality of valves (16, 17),
 wherein an actuating pressure ($p\_B$) is applicable by the valve device (15) and the shuttle valves (2C to 6D) to the piston chambers (2A to 6B) of the piston units (2 to 6), the actuating pressure being freely adjustable by the valves (16, 17), the piston chambers (2A to 6B) of the piston units (2 to 6) configured to be brought into operative connection with a low-pressure region (52) either by the shuttle valves (2C to 6D) and a prefilling valve (32, 33) or by the shuttle valves (2C to 6D), the valve device (15) and the valves (16, 17), and wherein the spring assemblies (2E to 6F) of the shuttle valves (2C to 6D) hold the shuttle valves (2C to 6D) in an operating state that connects the piston chambers (2A to 6B) to the low-pressure region (52) by the prefilling valve (32, 33) when the actuating pressure (p_B) is less than a pressure threshold of the actuating pressure (p_B).

2. The multi-speed transmission according to claim 1, further comprising a plurality of throttle devices (2G to 6H) provided between the shuttle valves (2C to 6D) and the prefilling valve (32, 33).

3. The multi-speed transmission according to claim 2, further comprising a plurality of additional throttle devices (50, 51) provided downstream of the valves (16, 17) and upstream of the low-pressure region (52).

4. The multi-speed transmission according to claim 3, wherein a cross-section of the throttle devices (2G to 6H) between the shuttle valves (2C to 6D) and the prefilling valve (32, 33) is smaller than a cross-section of the additional throttle devices (50, 51) downstream of the valves (16, 17).

5. The multi-speed transmission according to claim 3, further comprising a piston (54) in each piston unit (2 to 6),
    wherein each of the throttle devices (2G to 6H) between the shuttle valves (2C to 6D) and the prefilling valve (32, 33) has a bore (57; 57A, 57B) provided in one of the pistons (54), the pistons (54) configured to longitudinally displace in valve housings (53) between two end positions, and
    wherein the spring assemblies (2E to 6F) of the shuttle valves (2C to 6D) apply a spring force to the pistons (54) that acts in the direction of a first end position of the two end positions, the piston chambers (2A to 6B) in operative connection with the respective prefilling valve (32, 33) by the shuttle valves (2C to 6D) in the first end position of the two end positions.

6. The multi-speed transmission according to claim 5, wherein:
    the actuating pressure (p_B) is applicable at control surfaces (55) of the pistons (54) so as to act against the spring assemblies (2E to 6F) of the shuttle valves (2C to 6D) and to act in the direction of a second end position of the two end positions;
    the piston chambers (2A to 6B) are suppliable with the actuating pressure (p_B) in the second end position of the two end positions; and
    the operative connection between the piston chambers (2A to 6B) and the prefilling valve (32, 33) is blocked in the second end position of the two end positions.

7. The multi-speed transmission according to claim 5, wherein the bores (57; 57A, 57B) are provided in diametral areas (54A) of the pistons (54) and extend perpendicularly to longitudinal axes (58) of the pistons (54), the pistons (54) mounted via the diametral areas (54A) in the valve housings (53) in a radial direction.

8. The multi-speed transmission according to claim 7, wherein the bores (57; 57A, 57B) open into blind hole bores (59), the blind hole bores (59) extending in the longitudinal direction of the pistons (54) in the diametral areas (54A) and in operative connection with the prefilling valve (32, 33).

9. The multi-speed transmission according to claim 7, wherein each of the pistons (54) has a further diametral area (54B), the diameters of the further diametral areas (54B) being greater than the diameters of the diametral areas (54A) and at least partially circumscribing the diametral areas (54A) along the longitudinal direction.

10. The multi-speed transmission according to claim 9, wherein an annular groove (60) is disposed between the further diametral areas (54B) and the diametral areas (54A) of the pistons (54), the spring assemblies (2E to 6F) at least partially arranged in the annular groove (60), a first end of each of the spring assemblies (2E to 6F) abutting in groove bottoms (61) of the annular grooves (60) and a second end of each of the spring assemblies (2E to 6F) abutting the valve housings (53).

11. The multi-speed transmission according to claim 9, wherein:
    the spring assemblies (2E to 6F) of the shuttle valves (2C to 6D) encircle both the diametral areas (54A) and additional diametral areas (54C) of the pistons (54), the diameters of the additional diametral areas (54C) being smaller than the diameters of the further diametral areas (54B) and larger than the diameters of the diametral areas (54A); and
    a first end of each of the spring assemblies (2E to 6F) abuts steps between the further diametral areas (54B) and the additional diametral areas (54C) and a second end of each of the spring assemblies (2E to 6F) abuts the valve housings (53).

12. The multi-speed transmission according to claim 8, further comprising at least two mutually aligned bores (57A, 57B) in the throttle devices (2G to 6H) between the shuttle valves (2C to 6D) and the prefilling valve (32, 33) which connect the blind hole bores (59) to peripheral areas defined by the diametral areas (54A) of the pistons and the valve housings (53).

13. The multi-speed transmission according to claim 5, wherein the pistons (54) are at least partially anodized.

14. The multi-speed transmission according to claim 5, wherein each of the pistons (54) has at least two permanently connected parts (54A, 54B).

15. The multi-speed transmission according to claim 5, wherein each of the pistons (54) is one piece.

* * * * *